United States Patent
Sakundiak

(10) Patent No.: US 6,840,877 B2
(45) Date of Patent: Jan. 11, 2005

(54) ROTATING DRIVE APPARATUS

(76) Inventor: Larry Sakundiak, Box 1996, 2800 Pasqua Street North, Regina, SK (CA), S4P 3E1

( * ) Notice: Subject to any disclaimer, the term of this patent is extended or adjusted under 35 U.S.C. 154(b) by 119 days.

(21) Appl. No.: 10/269,348

(22) Filed: Oct. 11, 2002

(65) Prior Publication Data

US 2003/0073529 A1 Apr. 17, 2003

(30) Foreign Application Priority Data

Aug. 2, 2002 (CA) .................................. 2395780

(51) Int. Cl.$^7$ .............................. F16H 7/00; F16H 7/08
(52) U.S. Cl. ......................... 474/87; 474/136; 474/148
(58) Field of Search ..................... 474/73–74, 86–89, 474/114–117, 133–136, 146, 150, 199; 74/89.21, 89.22, 606 R

(56) References Cited

U.S. PATENT DOCUMENTS

| | | | | |
|---|---|---|---|---|
| 823,846 A | * | 6/1906 | Crowell ........................ | 474/86 |
| 2,162,624 A | * | 6/1939 | Logue .......................... | 474/87 |
| 3,045,773 A | * | 7/1962 | Sampietro ..................... | 474/100 |
| 3,834,246 A | * | 9/1974 | McGilp ........................ | 474/135 |
| 3,985,038 A | * | 10/1976 | Fowler ........................ | 474/136 |
| 4,028,964 A | * | 6/1977 | Jones .......................... | 474/88 |
| 4,377,260 A | * | 3/1983 | Huffman ....................... | 474/86 |
| 5,244,198 A | * | 9/1993 | Green .......................... | 271/125 |
| 5,830,094 A | * | 11/1998 | DeNijs ......................... | 474/73 |
| 6,036,611 A | * | 3/2000 | Bigo et al. .................... | 474/88 |

* cited by examiner

*Primary Examiner*—Marcus Charles
(74) *Attorney, Agent, or Firm*—Frost Brown Todd LLC

(57) ABSTRACT

A rotating drive apparatus comprises a plurality of shafts rotatably mounted in the apparatus substantially parallel to each other. At least one shaft is adapted to be operatively connected to a power source for rotation thereof. An idler is rotatably mounted on one of the shafts. A first band connector engages at least two shafts such that turning of the first band connector in response to rotation of one shaft causes rotation of the other. A second band connector engages the idler and at least two shafts such that the two shafts engaged by the second band connector rotate when the first band connector turns.

6 Claims, 3 Drawing Sheets

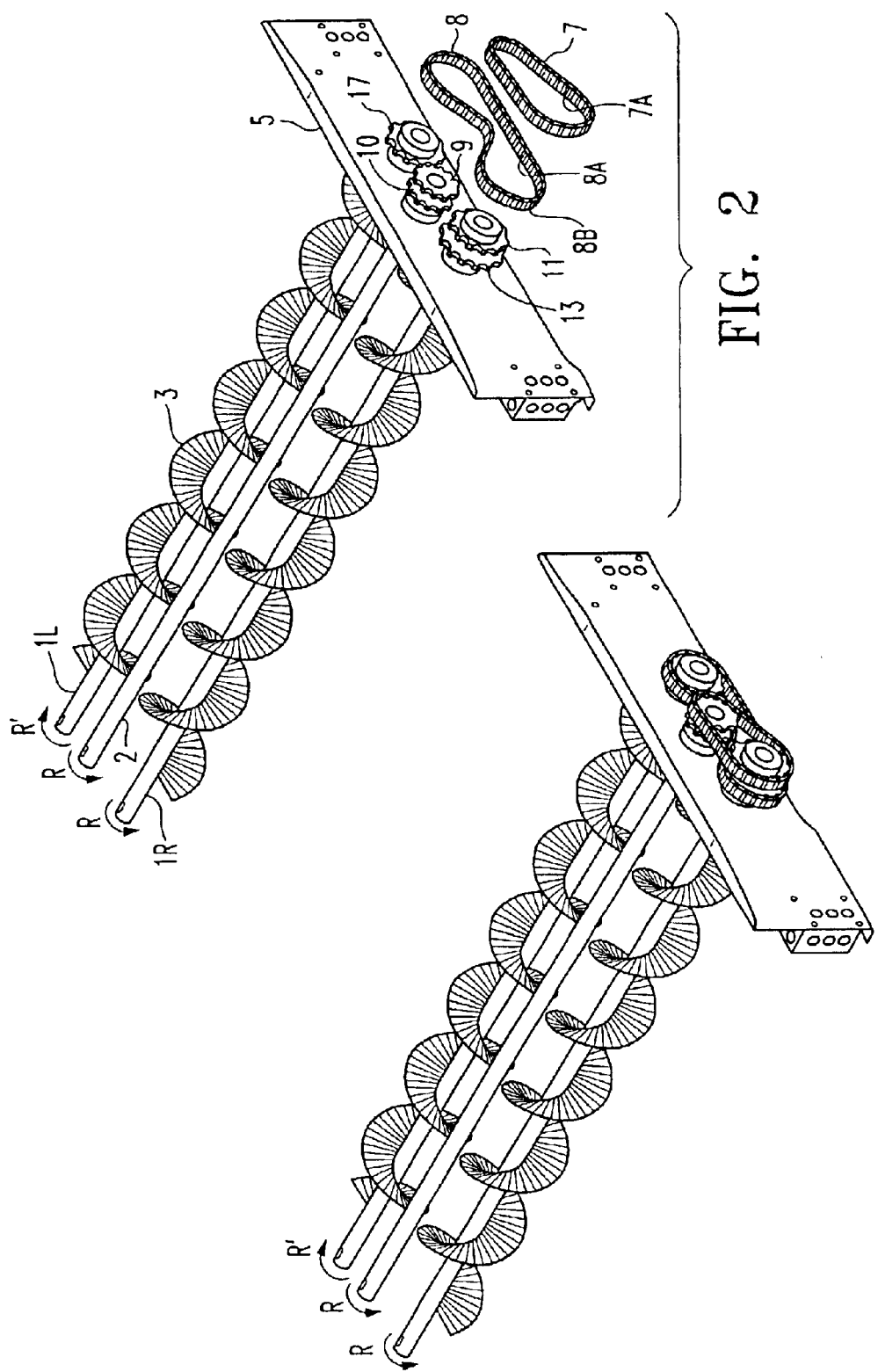

US 6,840,877 B2

ROTATING DRIVE APPARATUS

CROSS REFERENCE TO RELATED APPLICATIONS

This invention claims priority to Canadian Patent Application Serial No. 2,395,780, filed Oct. 12, 2001.

1. Field of the Invention

This invention is in the field of rotating drive mechanisms for shafts and the like, and in particular such mechanisms where the driven shafts rotate in opposite directions.

2. Background

It is common in various mechanical devices to drive a plurality of shafts from a single drive shaft using a flexible band connector and suitable band engagement adapters mounted on the shafts. The band connector and corresponding band engagement adapters are commonly a chain, with corresponding sprockets mounted to the shafts, or belt, with corresponding pulleys mounted to the shafts. Often one driven shaft will rotate in the same direction as the drive shaft, while another driven shaft will rotate in the opposite direction. Such known reversing drive configurations are demonstrated in U.S. Pat. No. 823,846 to Crowell, U.S. Pat. No. 839,786 to Sester, U.S. Pat. No. 4,377,260 to Huffman, U.S. Pat. No. 4,919,598 to Wycliffe, and U.S. Pat. No. 5,823,452 to Ballew et al.

As can be seen from the prior art, attaining the desired rotational direction of any shaft is accomplished by orienting an outer edge of the band engagement adapter on the shaft with a portion of the band connector that is traveling in the desired direction. The band connector forms a closed loop, such that the band connector has an "inside" surface and an "outside" surface. A shaft where the band engagement adapter engages the outside of the band connector rotates in one direction while a shaft where the band engagement adapter engages the inside of the band connector rotates in the opposite direction. The drive shaft causes the band connector to move in a given direction, and any driven shafts are arranged inside or outside the closed loop as desired to provide the required rotational direction.

In order to have satisfactory operation, it is necessary that the band connector engage a sufficient length of the circumference of the band engagement adapter to prevent slippage or skipping of the band connector on the band engagement adapter. When reversing shaft rotation, it is often desirable to provide an idler in order to ensure such engagement. For example see idler sprocket (26) in Sester '786, and idler sprocket/pulley (32) in Wycliffe '598. Such idlers are conventionally rotatably mounted on a separate idler shaft.

SUMMARY OF THE INVENTION

It is the object of the present invention to provide a compact rotating drive apparatus.

It is a further object of the invention to provide such an apparatus wherein an idler is rotatably mounted on one of the driven shafts.

It is a further object of the invention to provide such an apparatus wherein at least one driven shaft rotates in a direction opposite the direction of rotation of at least one other driven shaft.

The invention provides, in one aspect, a rotating drive apparatus comprising a drive shaft rotatably mounted in the apparatus and adapted to be operatively connected to a power source for rotation thereof. First and second driven shafts are rotatably mounted in the apparatus and oriented substantially parallel to the drive shaft and an idler is rotatably mounted on the first driven shaft. A first band connector engages the drive shaft and first driven shaft such that the first driven shaft rotates in response to rotation of the drive shaft, and a second band connector engages the idler, the second driven shaft, and the drive shaft such that the second driven shaft rotates in response to rotation of the drive shaft.

The invention provides, in a second aspect, a rotating drive apparatus comprising a plurality of shafts rotatably mounted in the apparatus substantially parallel to each other. At least one shaft is adapted to be operatively connected to a power source for rotation thereof. An idler is rotatably mounted on one of the shafts. A first band connector engages at least two shafts such that turning of the first band connector in response to rotation of one of the at least two shafts causes rotation of the other of the at least two shafts. A second band connector engages the idler and at least two shafts such that the two shafts engaged by the second band connector rotate when the first band connector turns.

The invention provides, in a third aspect, a rotating chain drive apparatus comprising a drive shaft rotatably mounted in the apparatus and adapted to be operatively connected to a power source for rotation thereof in a first direction. First and second driven shafts are rotatably mounted in the apparatus and oriented substantially parallel to the drive shaft, and an idler sprocket is rotatably mounted on the first driven shaft by a bearing. A first chain engages, on an inside surface thereof, a first drive sprocket fixed to the drive shaft and a sprocket fixed to the first driven shaft such that the first driven shaft rotates in the first direction in response to rotation of the drive shaft. A second chain engages, on an inside surface thereof, the idler sprocket and a sprocket fixed to the second driven shaft, and engages, on an outside surface thereof, a second drive sprocket fixed to the drive shaft such that the second driven shaft and idler sprocket rotate in a second direction opposite to the first direction in response to rotation of the drive shaft.

The invention provides a rotating drive that is made more compact than prior art drives by using a driven shaft as an idler shaft. The apparatus is particularly adapted to driving a pair of shafts in opposite directions, and can be useful when driving a plurality of shafts at different speeds.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a perspective view of an apparatus of the invention with drive chains installed;

FIG. 2 is a perspective view of the apparatus of FIG. 1 with the drive chains removed;

DETAILED DESCRIPTION OF THE ILLUSTRATED EMBODIMENTS

Figure 3:
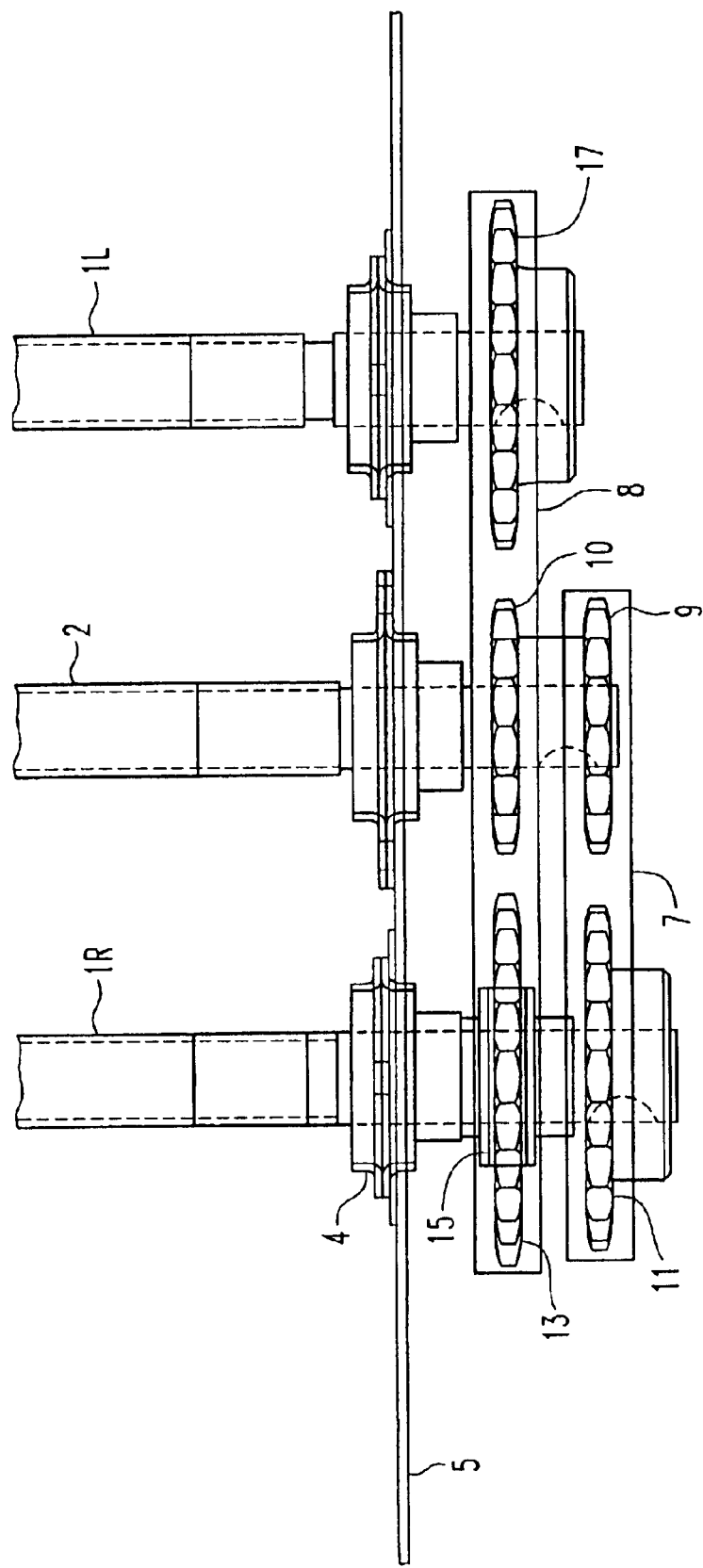
FIG. 3 is a schematic top view of the apparatus of FIG. 2.

FIGS. 1 and 2 illustrate a rotating drive apparatus 1 of the invention embodied in a dual auger conveyor of the type that would be used in the bottom of a hopper to move grain away to further conveyors as it is dumped into the hopper. For best performance in such an application, the shafts 1L, 1R carrying auger flighting 3 rotate in opposite directions R, R'.

The apparatus 1 comprises a plurality of shafts 1L, 1R, and 2 rotatably mounted on bearings 4 in a frame 5 substantially parallel to each other. The drive shaft 2 is adapted to be operatively connected to a power source for rotation thereof. In the illustrated application, the drive shaft 2 would typically be connected by a universal joint to the end of an inclined auger shaft that is fed by the auger flighting 3 on the shafts 1L, 1R.

A first band connector takes the form of first chain 7. The first chain 7 engages, on an inside surface 7A thereof, an outer drive sprocket 9, fixed to the drive shaft 2 and a first driven sprocket 11 fixed to the first driven shaft 1R such that turning of the first chain 7 in response to rotation of one of the shafts 1R, 2 causes rotation of the other of the two shafts 1R, 2. As the first chain 7 engages the sprockets 9 and 11 on the inside surface 7A thereof, the shafts 2, 1R rotate in the same direction. The normal direction of rotation of these shafts 2, 1R in the illustrated embodiment is indicated by the arrow R.

In the illustrated embodiment the drive shaft 2 will normally be rotated by the power source and thus cause the first chain 7 to turn which in turn causes the first driven shaft 1R to rotate. Conversely, however, if the first driven shaft 1R is rotated manually, the first chain 7 will cause the first driven shaft 2 to rotate. This result is true for any set of shafts engaged by one or more band connectors—once the shafts are engaged, rotating any one of them will rotate the others.

An idler sprocket 13 is rotatably mounted on the first driven shaft 1R adjacent to and behind the first driven sprocket 11. The idler sprocket 13 is mounted by a bearing 15 such that it can rotate freely in either direction irrespective of the rotation of the first driven shaft 1R. A second drive sprocket 10 is fixed to the drive shaft 2 adjacent to and behind the first drive sprocket 9. The first and second drive sprockets 9, 10 can be incorporated into a conventional double sprocket. A second driven sprocket 17 is fixed to the second driven shaft 1L.

A second band connector takes the form of second chain 8 that engages, on an inside surface 8A thereof, the idler sprocket 13 and the second driven sprocket 17, and also engages, on an outside surface 8B thereof, the second drive sprocket 10. The second chain 8 passes around the outside of the idler sprocket 13 and the second driven sprocket 17, and under the second drive sprocket 10. Thus the shafts 2, 1L engaged by the second chain 8 rotate when the first chain 7 turns in response to rotation of the drive shaft 2. The idler sprocket 13 and second driven sprocket 17 engage the second chain 8 on the inside surface 8A thereof, and therefore rotate in the same direction. However, since the second chain 8 engages the drive shaft 2 on the outside surface 8B of the second chain 8, the sprockets 13, 17 rotate in a direction R' opposite to the direction of rotation of the drive shaft 2 and opposite to the rotation of the first driven shaft 1R.

As illustrated the idler sprocket 13 has a somewhat larger diameter than the adjacent first driven sprocket 11 in order to provide increased engagement of the second drive sprocket 10. Smaller or larger idler sprockets 13 can be used as required by a particular application.

Figure 4:
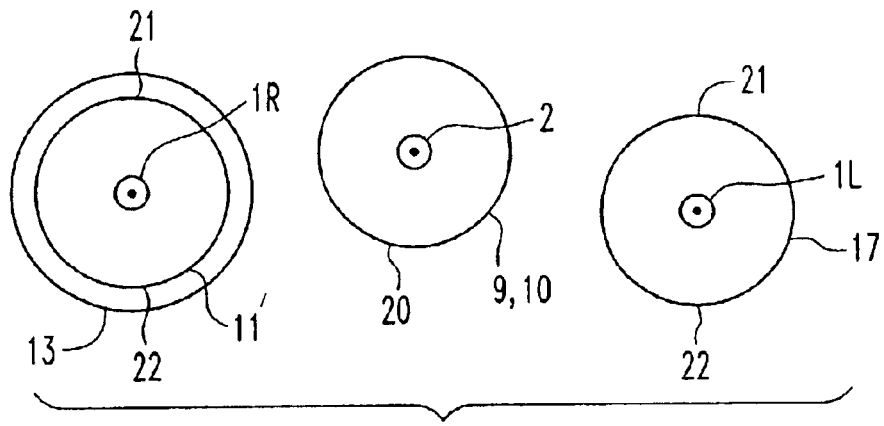
FIG. 4 is a schematic end view of the apparatus of FIG. 2.

As best seen in FIG. 4, in the illustrated embodiment the drive shaft 2 is located between the first and second driven shafts 1R, 1L. A lower edge 20 of the second drive sprocket 10 is positioned between opposite first and second edges 21, 22 of the sprockets on the first and second driven shafts 1R, 1L.

Figure 5:
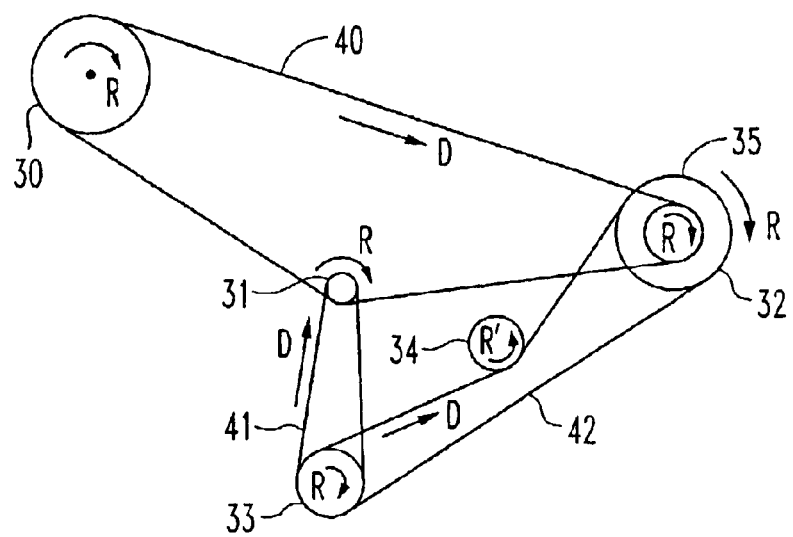
FIG. 5 is a schematic end view of an alternate embodiment of the invention.

FIG. 5 schematically illustrates an alternate rotating drive apparatus comprising a plurality of shafts 30, 31, 32, 33, and 34 rotatably mounted in the apparatus substantially parallel to each other. One of the shafts is adapted to be operatively connected to a power source for rotation thereof. An idler 35 is rotatably mounted on shaft 32. A first band connector, 40 engages shafts 30, 31, and 32 such that turning of the first band connector 40 in response to rotation of one of the shafts 30, 31, 32 causes rotation of the other engaged shafts. A second band connector 41 engages shafts 31 and 33 so that they rotate together. A third band connector 42 engages the idler 35 and shafts 33 and 34 such that they rotate when the first band connector 40 turns.

In FIG. 5, the band connectors 40, 41, 42 are illustrated as belts engaging pulleys fixed to the shafts. The belts move in direction D causing the shafts 30, 31, 32, and 33, as well as the idler 35, to rotate in direction R, while the shaft 34 rotates in an opposite direction R'.

An advantage of the configuration of FIG. 5 is that although the idler 35, and the shaft 32 on which it is rotatably mounted, rotate in the same direction R, it is not required that that the angular velocity of the idler 35 and shaft 32 be the same. Thus various sized pulleys may be used, allowing greater variability in shaft speeds.

In any apparatus where a plurality of shafts are connected by a plurality of band connectors, it could be advantageous to provide an idler rotatably mounted on one of the shafts in order to facilitate rotating a shaft in an opposite direction, or at a different speed. Mounting the idler on one of the required shafts removes the need for an extra shaft and makes the apparatus more compact and economical.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A rotating drive apparatus comprising:
    a drive shaft rotatably mounted in the apparatus and adapted to be operatively connected to a power source for rotation thereof;
    first and second driven shafts rotatably mounted in the apparatus and oriented substantially parallel to the drive shaft;
    an idler rotatably mounted on the first driven shaft;
    a first band connector engaging the drive shaft and first driven shaft such that the first driven shaft rotates in response to rotation of the drive shaft;
    a second band connector engaging the idler, the second driven shaft, and the drive shaft such that the second driven shaft rotates in response to rotation of the drive shaft
    wherein the drive shaft and the second driven shaft rotate in opposite directions.

2. The apparatus of claim 1 wherein the drive shaft engages an outside surface of the second band connector and the second driven shaft engages an inside surface of the second band connector.

3. A rotating chain drive apparatus comprising:

a drive shaft rotatably mounted in the apparatus and adapted to be operatively connected to a power source for rotation thereof in a first direction;

first and second driven shafts rotatably mounted in the apparatus and oriented substantially parallel to the drive shall;

an idler sprocket rotatably mounted on the first driven shaft by a bearing;

a first chain engaging, on an inside surface thereof, a first drive sprocket fixed to the drive shaft and a sprocket fixed to the first driven shaft such that the first driven shaft rotates in the first direction in response to rotation of the drive shaft;

a second chain engaging, on an inside surface thereof, the idler sprocket and a sprocket fixed to the second driven shaft, and engaging, on an outside surface thereof, a second drive sprocket fixed to the drive shall such that the second driven shaft and idler sprocket rotate in a second direction opposite to the first direction in response to rotation of the drive shaft.

4. The apparatus of claim 3 wherein the first and second drive sprockets are integrated into a double drive sprocket.

5. The apparatus of claim 3 wherein the drive shaft is located between the first and second driven shafts.

6. The apparatus of claim 5 wherein a first edge of the second drive sprocket is positioned between opposite first and second edges of the sprockets on the first and second driven shafts.

* * * * *

UNITED STATES PATENT AND TRADEMARK OFFICE
CERTIFICATE OF CORRECTION

PATENT NO. : 6,840,877 B2
DATED : January 11, 2005
INVENTOR(S) : Larry Sakundiak It is certified that error appears in the above-identified patent and that said Letters Patent is hereby corrected as shown below:

Column 5,
Line 9, "drive shall" should read -- drive shaft --.

Column 6,
Line 4, "drive shall" should read -- drive shaft --.

Signed and Sealed this

Twenty-fourth Day of May, 2005

JON W. DUDAS
*Director of the United States Patent and Trademark Office*